Figure 1:
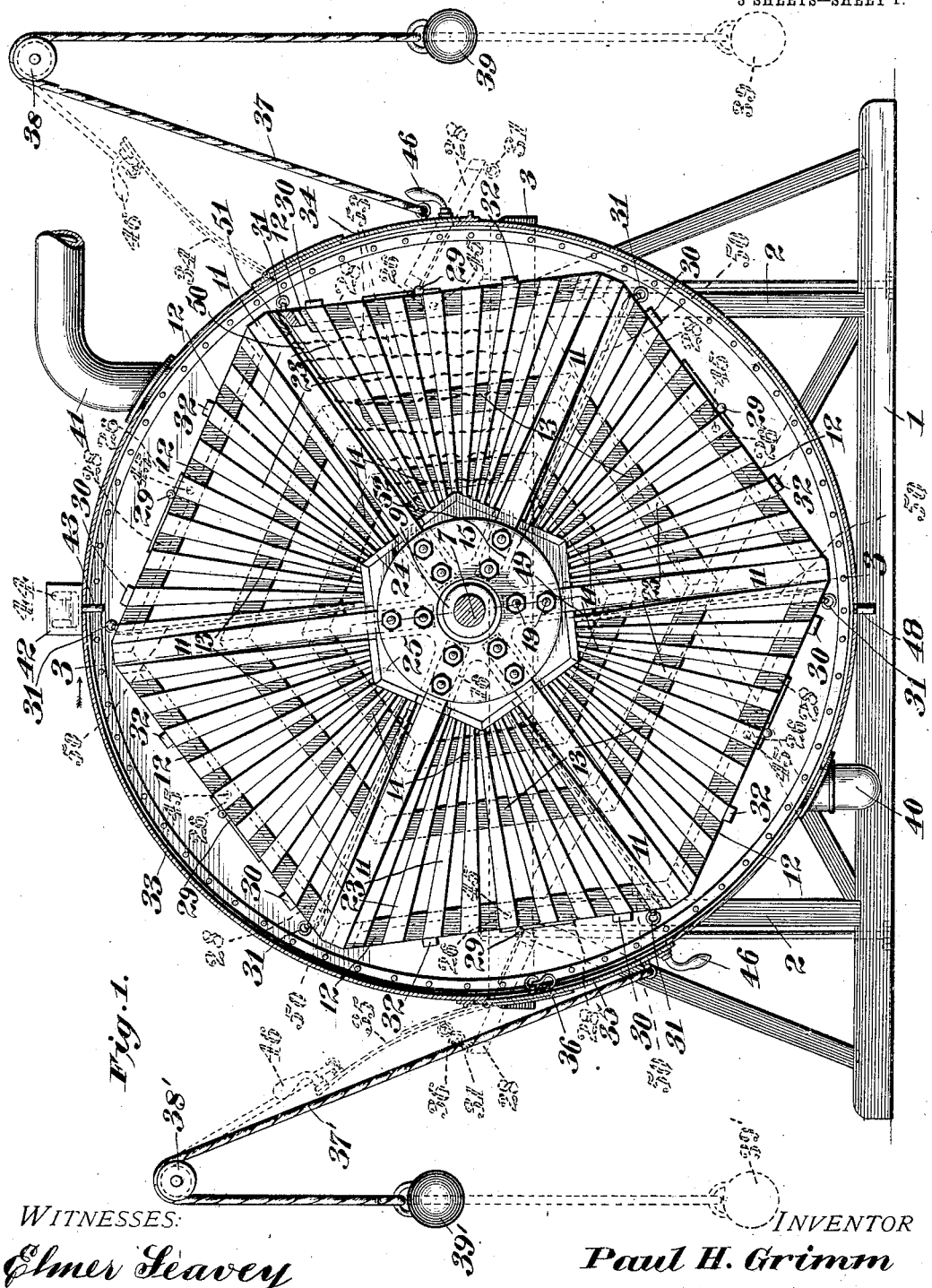

No. 836,876. PATENTED NOV. 27, 1906.
P. H. GRIMM.
COMBINED LEATHER HEATING AND STUFFING APPARATUS.
APPLICATION FILED MAY 16, 1904.

3 SHEETS—SHEET 1.

WITNESSES:
Elmer Leavey
Walter Allen

INVENTOR
Paul H. Grimm
BY Schoenborn
Attorney

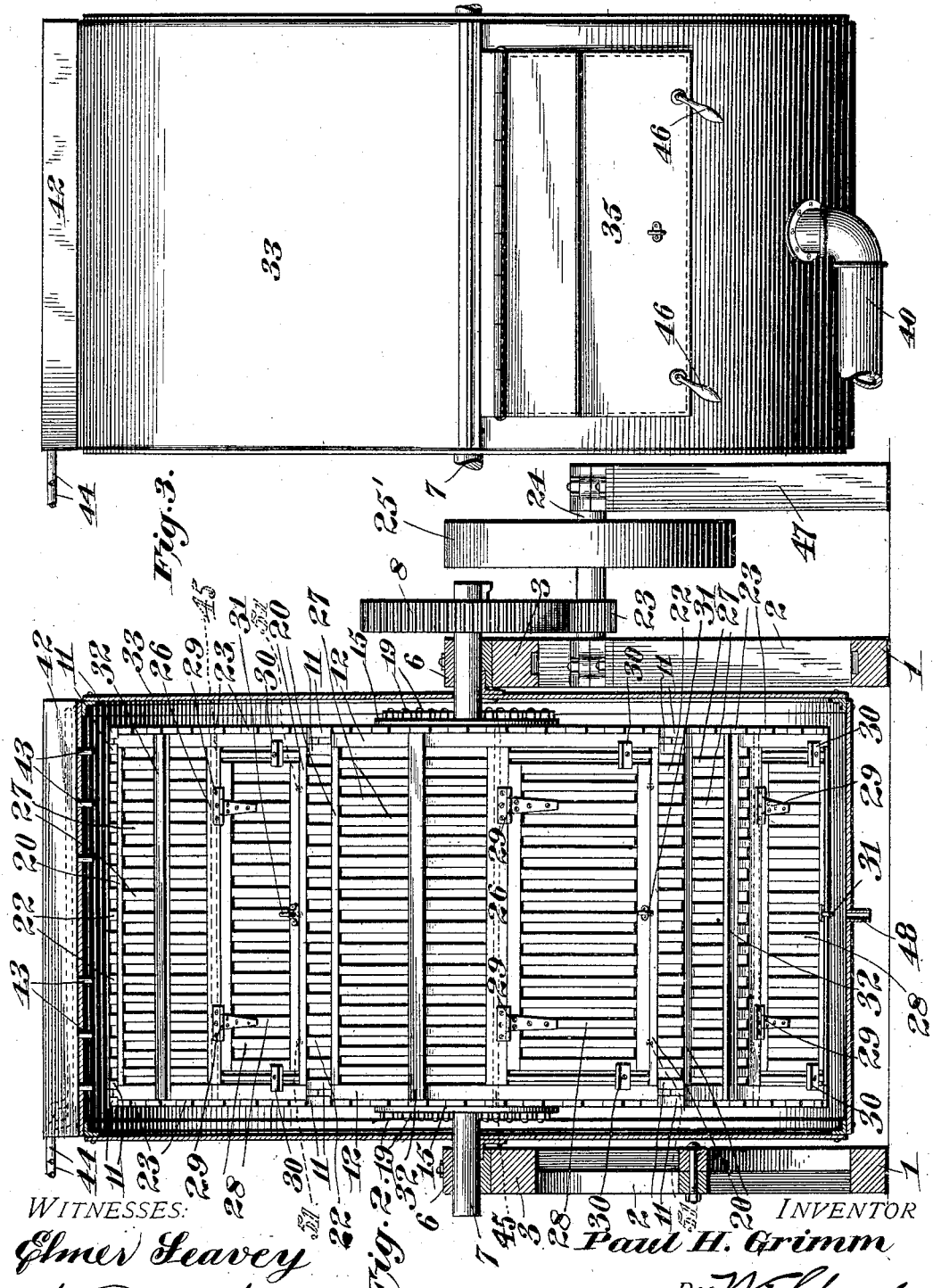

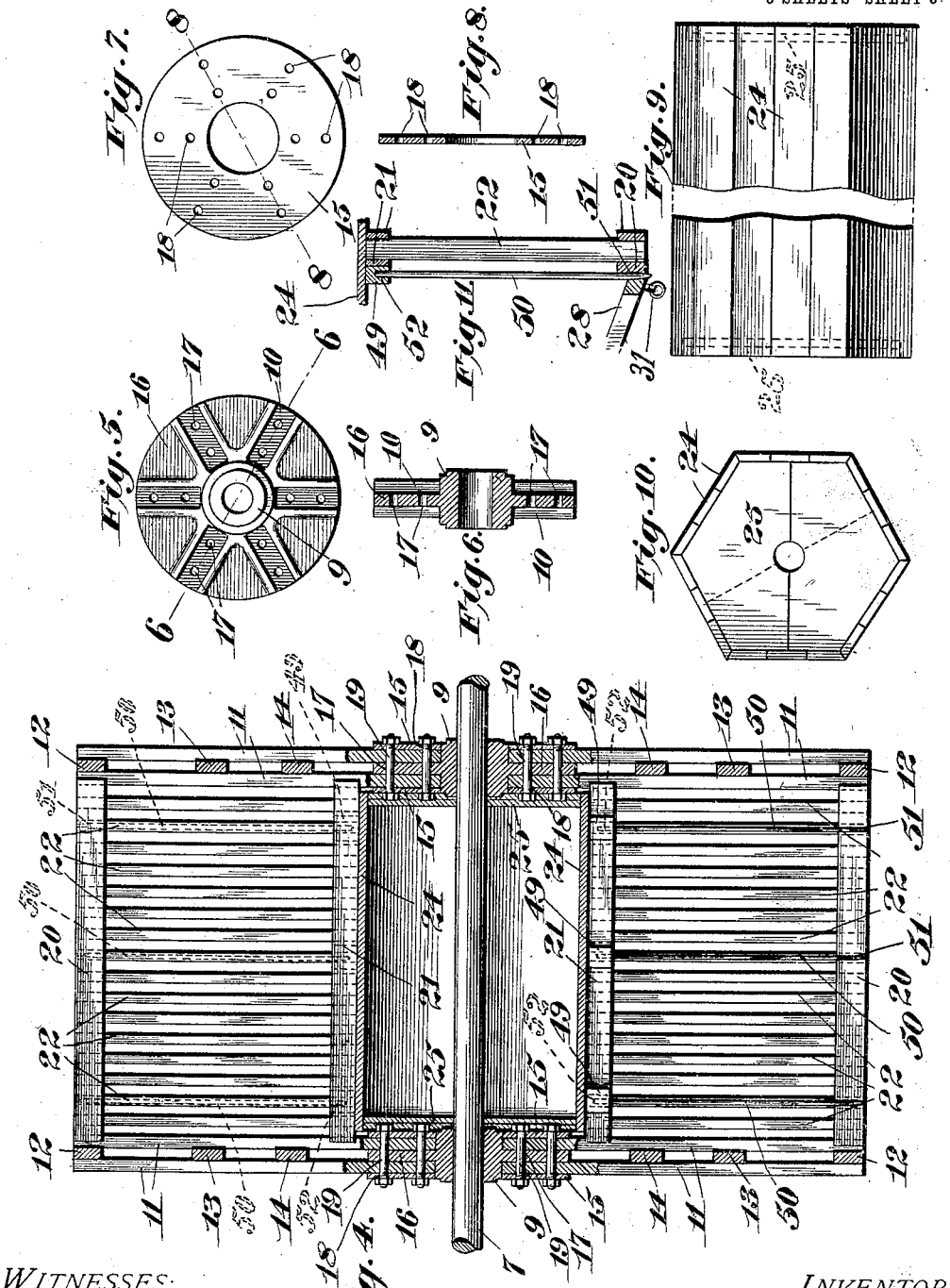

UNITED STATES PATENT OFFICE.

PAUL H. GRIMM, OF GLEN COVE, NEW YORK, ASSIGNOR TO EDWARD R. LADEW, OF GLEN COVE, NEW YORK.

COMBINED LEATHER HEATING AND STUFFING APPARATUS.

No. 836,876.  Specification of Letters Patent.  Patented Nov. 27, 1906.

Application filed May 16, 1904. Serial No. 208,288.

*To all whom it may concern:*

Be it known that I, PAUL H. GRIMM, a citizen of the United States, residing at Glen Cove, in the county of Nassau and State of New York, have invented certain new and useful Improvements in a Combined Leather Heating and Stuffing Apparatus, of which the following is a specification.

My invention relates to that class of inventions known as "stuffing-wheels," which are used in the treatment of leather after having been tanned and scoured.

The purpose of the invention is to construct in one apparatus a combined stock-heater and stuffing-wheel so that the material treated therein will quickly, thoroughly, and uniformly absorb the grease, oil, or other suitable stuffing materials with less attention and labor than heretofore and the leather belting or like articles manufactured therefrom will be more durable, firm, and pliable than those made by previous apparatus and methods.

The objects of my invention are, first, to reduce the time and labor required, and therefore the cost, in stuffing a given quantity of leather; second, reduce the amount of floor-space usually taken up by the section of a plant devoted to the preliminary heating and stuffing of leather; third, reduce the cost to equip a plant engaged in the manufacture of leather belting or the like articles by having combined in the same device both the leather-heating apparatus and the stuffing-wheel without materially increasing the size of the usual stuffing-wheel or the cost of its manufacture; fourth, to reduce the labor and avoid the loss of heat which necessarily follows when the heating of the stock and the stuffing of the same are carried out in two separate and independent apparatus; fifth, to keep at a uniform, certain, and proper temperature and consistency every section of the entire body of stock being stuffed in the wheel; sixth, to uniformly knead and expose every portion of the stock to the heated atmosphere and stuffing material, thereby insuring each small section of the stock to absorb the same and proper amount of stuffing material, and consequently producing leather of a superior quality in having a uniform texture and pliability; seventh, to evenly distribute the weight of the stock within and around the wheel to insure a uniform speed of rotation of the wheel, and thereby avoiding shock and strain of the apparatus; eighth, to subdivide the weight of the stock in small and separated portions in order to prevent the stock while being tumbled in the stuffing-wheel being subjected to such a degree of compression sufficient to squeeze out the absorbed stuffing material; ninth, to arrange the parts comprising the apparatus so that the charging and discharging of the stuffing-wheel can be carried on quickly and simultaneously; tenth; to introduce into the apparatus a large volume of heated air at a comparatively low, proper, and non-injurious temperature rather than a limited volume of air at a high temperature; eleventh, other evident advantages of the specific construction and arrangement of the combined heater and stuffing-wheel, which will hereinafter appear from the detailed description and the manner of using the same.

My invention consists of structural features and relative arrangement of elements which will be more fully and clearly described, and pointed out in the appended claims.

Referring to the three sheets of drawings, in which similar reference characters indicate the same parts in the several figures, Figure 1 is an end view of the combined heater and stuffing-wheel with one end of the surrounding casing removed and showing, in dotted lines, the position the closures of the casing and doors of the stuffing-wheel assume when the apparatus is being charged and discharged at the same time. Fig. 2 is a side elevation of the stuffing-wheel, means for rotating the same, and the surrounding casing in section. Fig. 3 is a side view of the outer casing, also showing the closure through which the stuffing-wheel is discharged. Fig. 4 is a longitudinal section of the stuffing-wheel on the line 3 3 of Fig. 1. Fig. 5 is an elevation of a hub attached to each end of the shaft. Fig. 6 is a section on line 6 6 of Fig. 5. Fig. 7 is an elevation of one of the plates attached on each side of the hubs. Fig. 8 is a section on line 8 8 of Fig. 7. Fig. 9 is a side and broken view of the central drum within the wheel and surrounding the shaft of the same. Fig. 10 is an end view of the drum. Fig. 11 is a fragmentary and transverse section of a compartment in the stuffing-wheel, showing the manner of supporting and holding the suspension rods or bars therein.

Heretofore in apparatus for the purpose of heating and stuffing leather it was necessary to provide two distinct and separate devices. One was for the purpose of heating the stock before being transferred into the stuffing-wheel or similar apparatus. This necessitated two handlings of the stock and loss of much labor, time, and heat, which are entirely overcome in my device, which will now be described.

Referring to Figs. 1 and 2 of the drawings, illustrating the preferred form of my apparatus, 1 is a base of a supporting-frame which is provided with the upright frames 2 2, having the horizontal cross-pieces 3 3. The frame, which forms no part of the invention, may be made of any suitable shape and material and reinforced with any suitable braces in order to provide a stiff and secure support for a stationary casing and a rotating wheel or cage, which will be presently described.

Secured to the cross-pieces 3 3 are bearings 6 6, which rotatably support a shaft 7, having one end extending beyond the main supporting-frame and provided with a gear 8. An auxiliary supporting-frame 47 in conjunction with a main frame-piece 2 supports a rotary shaft 24, having a gear 23 meshing with the gear 8. The shaft 24 is rotated by a pulley 25' at any suitable speed, readily understood by those skilled in the art and needs no further description.

9 9 (see Figs. 4', 5', and 6) are hubs fixed near the ends of the shaft 7 and rotating with the same.

16 is an extension on each hub and provided in this instance with six radial grooves or sockets 10 10', preferably on both sides of the extension 16.

17 17 are bolt-holes through the extensions.

While herein are shown six grooves or sockets 10 10, I wish it to be distinctly understood the number may be increased or decreased, depending upon the number of compartments it is desired to subdivide the stuffing-wheel. Likewise one may dispense with the grooves or slots on one of the sides of both hubs, if so desired, without departing from the invention.

11 11 are radial pieces which have their inner ends fit the grooves or slots 10 10 and their outer ends forming the ends of the spokes of the wheel at each end of the stuffing apparatus.

15 15 (see Figs. 2, 7, and 8) are circular plates having bolt-holes 18 18, registering with the openings 17 17 of the hub extensions. These plates 15 15 are disposed on each side of a hub extension 16 and firmly hold the radial pieces 11 11 to the extension by means of bolts 19 19, as clearly shown in Fig. 4.

12 12 (see Fig. 4) are outer end pieces connecting the ends of the radial pieces 11 11 and are preferably placed between and at the ends of each pair of radial pieces placed on the opposite sides of a hub.

13 and 14 are inner and additional end pieces also secured between the radial pieces in a similar manner as the end pieces 12 12. (See Figs. 1 and 4.)

20 20 (see Figs. 2 and 4) are outer longitudinal pieces connecting the ends of the radial pieces at one end of the stuffing-wheel with those of the other end.

21 21 are inner longitudinal pieces parallel to the pieces 20 and secured in the same manner to the radial pieces as 20.

22 22 are separated slats attached to the longitudinal pieces 20 and 21 and forming the division-walls between the compartments.

23 23 are separated slats, preferably disposed radially and secured to the end pieces 12, 13, and 14.

24 24 (see Figs. 1, 9, and 10) are flat pieces secured within the wheel and forming a drum or cylinder about the shaft for the purpose of providing bottoms with inclined sides in each of the compartments of the stuffing-wheel.

25 25 are the ends of the drums or cylinders formed by the pieces 24 24.

26 26 are outside longitudinal pieces dividing the outer sides of each compartment.

45 45 (see Figs. 1 and 2) are longitudinal bolts extending from one head to the other of the wheel for bracing and holding the wheel together.

27 27 are outside slats connected to the pieces 20 and 26 and closing a portion of the openings on the outer side or periphery of the wheel.

28 28 are slatted doors hinged at 29 29 to the pieces 24 for closing the other portion of the outer side or periphery of the wheel.

30 30 are means for locking the doors in place while the wheel is being rotated.

31 31 are fastening means or eyes for securing the swinging end of the door to the inside of the pivoted closure 35 of the casing, to be hereinafter described.

32 32 are longitudinal strips attached outside of the slats 27 27 of the wheel to deflect toward the interior of the wheel the oil or grease which flows down the slats 27 27 and doors 28 28 while the stuffing material is fed into the wheel and said wheel is being rotated.

33 is a closed casing preferably supported on the frames 2 2 and surrounding the stuffing-wheel in such a manner so as to allow the wheel to freely rotate therein without striking the sides or ends of the casing.

34 is a closure hinged to the casing and tightly sealing an opening in the same, through which the stuffing-wheel is charged with stock, to be hereinafter described. 35 is a similar closure hinged at the opposite side of the casing and sealing an opening through which the stock is discharged from the stuffing-wheel. 46 46 are suitable handles to said closures 34 and 35, which may be turned for locking the closures in their closed positions while the wheel is being rotated.

36 is a hook or other suitable means attached to the inside of closure 35 for engaging the fastening-eye 31, attached to the outside of doors 28 28.

37 37' are cables having one end attached to the closures 34 and 35 and which pass over rollers 38 38' and provided at their other ends with counterweights 39 39', respectively, for holding said closures in an elevated or open position.

Any other suitable means may be substituted for that shown and described to hold open the closures of the casing or doors of the wheel while the same is being charged or discharged.

40 is a conduit preferably leading into the lower part of the casing and is for the purpose of introducing heated air into the same. The pipe 40 may be provided with a valve for controlling the flow or circulation of the air through the casing and is connected to any source of air, which is forced over suitable heating-coils under normal or increased pressure by a blower. (Not shown.)

41 is an eduction-pipe for the heated air at the upper part of the casing and may be connected to the atmosphere or returned to the air heating and forcing apparatus, thus making a continuous circuit, and have the same air circulate back to the casing, and thereby save the heat in the same, which would otherwise be wasted if passed into the open air.

42 is a box or receptacle secured on the top of the casing 33 for receiving the oil or liquefied stuffing material to be introduced into the wheel and absorbed by the stock therein.

43 43 are feeding-ducts leading from the bottom of box 42 through the casing over the highest portion of the stuffing-wheel.

44 is a steam-coil in the bottom of box 42 for heating the oil therein and maintaining the fatty stuffing material in a liquefied condition.

45 is a drain-pipe connecting the lowest portion of the casing and may be connected to any suitable lifting or forcing means for returning to the box 42 the oil or stuffing material which falls from compartments and stock in the stuffing-wheel.

49 49, as shown in section in one of the compartments of Fig. 1 and in detail in Fig. 11, are two or more blocks of wood or suitable brackets secured to the bottom of each compartment and in the corner on the side corresponding to the swinging end of the door 28.

52 is a socket in each of the blocks or brackets 49.

51 51 are tapering recesses, preferably formed so that one half of a recess is on the outer frame of the door 28 and the other half on the door-jamb or piece 20. Each socket 52 is in a radial line with that of a recess 51.

50 50 are brass rods or tubes, each of which has one end resting in a socket 52 and the other end tapered and seated in a correspondingly-tapered recess 51. Thus it will be seen from this construction and arrangement when the door 28 is in its closed and secured position it firmly locks the rods 50 50 in their sockets and recesses.

53 53 are hides or pieces of material shown in dotted lines as strung or secured to the rods 50, as will be hereinafter described.

While I have shown and described the suspension-rods 50 in each of the compartments, these rods are not necessary in carrying out the essential features of the invention; but it is contemplated only using the same in treating certain stock which has been found very limp and having the objectionable feature of rolling up.

It will be seen from the foregoing description of the arrangement and construction of the rods 50 and the means for holding them within the wheel they may be easily and quickly inserted or removed from the wheel.

From the foregoing detailed description of the wheel it will be seen I have formed about the axis six compartments having slotted walls separating one compartment from the other, slatted ends and outer peripheral sides provided with an opening having a hinged door and an imperforate bottom. This construction and arrangement permits the heated air and oil or grease to have ready and thorough access to the interior of the stuffing-wheel while being rotated, and the stuffing material which finds its way to the bottom of a compartment is passed or deflected by the inclined sides forming the bottoms either into the center of its own compartment or the adjacent compartment during the rotation of the wheel.

While the drawings show a wheel with six compartments, I do not wish to confine myself to this exact number, as a greater or less number might be provided, and instead of having the wheel hexagonal in shape it might be constructed of a cylindrical form without changing the operation or essential features of the apparatus, and it will also be fully understood that any material can enter into the construction of the stuffing-wheel, but have found wood the cheapest, most convenient, and best for the purposes of a leather-stuffing wheel. Also instead of having conduits leading heated air into the casing I may employ any other means to heat the air confined therein, and thereby the stock in the stuffing wheel. Also any other means may be substituted for that shown in feeding the stuffing material into the wheel and which would be readily suggested by those skilled in the art without departing from the essential features of my invention.

The operation of the device is as follows: The closure 34 of the charging-opening is raised, as shown in dotted position in Fig. 1, and held suspended by the counterweight 39. The stuffing-wheel is rotated until one of the doors 28 registers with opening in the casing controlled by the closure 34. The door 28 is thrown out on its hinges until it rests on the lower ledge of the opening, as indicated in dotted lines. This compartment is then charged with a proper portion of the stock and the door 28 is closed and locked. The wheel is turned to the next compartment, which is opened, charged, and closed as above, and so on, until all the compartments have been satisfactorily charged. The closures of the casing are then securely fastened in their sealing position and the stuffing-wheel is set in rotary motion. The hot air is then introduced into the casing by the conduit 40 until the stock therein is of a proper temperature. The liquefied stuffing material in box 42 is now allowed to pass through the ducts 43 and trickle down upon the wheel, the openings between the slats permitting the heated air and stuffing material to freely enter into each of the compartments and cause the oil or grease to be quickly, thoroughly, and uniformly absorbed by the stock tumbled in the wheel. After the stock has been treated and tumbled a sufficient length of time the rotation of the wheel is stopped. The closure 35, controlling the opening on the opposite side of the casing from that where the wheel was charged, is then unlocked and raised in a position as indicated in dotted lines on the left of Fig. 1. The wheel within the casing is rotated until one of the doors 28 is made to register with this discharge-opening. The eye 31 of the door is then made to engage the hook 36 on the inside of the closure 35, which holds the same in a raised position and readily permits the stock to be removed from this compartment of the wheel. After emptying the compartment the door of the same is unhooked from hook 36 and locked in a closed position on the wheel. After a sufficient number of the compartments—and in the present instance three—have been discharged and an empty compartment registers with the opposite opening in the casing and controlled by the closure 34 the said closure can be opened, as previously described, and the charging operation can be carried on at one side of the apparatus at the same time that the discharging is going on at the other side. After the compartments are again filled the operations as above described are repeated. If it is desired to stuff a certain grade of stock which is very limp and readily rolls or balls up when tumbled in the stuffing-wheel, it is only necessary to add one or more of the suspension rods or bars 50 to the herein-described wheel. This is easily and quickly accomplished by inserting or securing one end of the rods or bars 50 in the sockets 52, as previously described, and shown in Fig. 11. As will be seen by referring to Fig. 1, the relation of the rods 50 within the compartment at the charging-opening of the casing is such that the suspension rods or bars are at the upper side of the compartment and inclined upwardly and their outer ends capable of being freed from the door jamb or piece 20 when the door 28 is opened, as indicated in dotted lines. The limp hides or other stock provided near their ends with a slit or a small clamp having a suitable suspending-ring can now be easily strung on a suspension rod or bar and will assume the position as indicated by the dotted lines 53 53. After a sufficient charge has been introduced in the compartment the ends of the rods 50 are placed in the recesses of the door jamb or piece 20 and held there until the door 28 is closed. Thus it will be seen by the simple operation in closing and locking the door I firmly hold the rods from any displacement, secure their free ends, and at the same time retain the stock on the rods or bars and within the compartment. This operation is repeated by bringing the several compartments to the charging-opening of the casing, as previously described, until the whole wheel has been properly charged. The wheel being now rotated, it is clear that one end of the stock is free to move back and forth on the rods or bars while the other end is tumbled about in the compartment and the stock therein cannot possibly be rolled or balled up. The discharging of the wheel when the rods are used is likewise easily accomplished, since the suspension rods or bars 50 in the compartment at the discharge-opening of the casing (see Fig. 1) are inclined downwardly, and when the door of a compartment in the wheel is opened, thereby releasing and uncovering the lower ends of the rods, the stuffed stock readily slips off the rods and is easily removed from the wheel.

It will be also understood the hides or stock can be strung on the suspension-rods before they are inserted or secured in their sockets, or the rods with the stock or hides can be removed at once from the wheel when a compartment is being discharged and another rod free of stock quickly substituted therefor.

It will be seen from the construction and arrangement of admitting the heated air into the casing, as herein disclosed, I have devised a simple and highly efficient means of introducing a large volume of air into the apparatus at a comparatively low and non-injurious temperature. By the use of this low degree of heat and large quantity of air I entirely overcome all the objectionable features of existing structures wherein the air is introduced into the apparatus through a restricted opening at a very high temperature and depending upon the expansion of the same in a large chamber to properly cool down and uniformly heat the stock within the wheel. The use of high temperatures and excessive heat cannot be easily controlled and are liable to damage the structure and flexibility of the leather.

From the herein-detailed disclosure of the arrangement of the combined heating and stuffing apparatus and mode of operation it will be seen that the objects of the invention enumerated in the statement of the invention are fully and expeditiously carried out.

Having now particularly described my invention, what I claim as new, and desire to secure by Letters Patent, is as follows:

1. A combined heater and stuffing apparatus for leather or like material, comprising a closed, hollow casing, an opening with a closure therefor on opposite sides of the casing, a rotary stuffing-wheel within the casing, and compartments in said wheel.

2. A combined heater and stuffing apparatus for leather or like material, comprising a closed, hollow casing, an opening with a closure therefor on opposite sides of the casing, a rotary stuffing-wheel within the casing, compartments in the wheel, and means for heating the interior of the casing.

3. A combined heater and stuffing apparatus for leather or the like material, comprising a closed, hollow casing, an opening with a closure therefor on opposite sides of the casing, a rotary stuffing-wheel within the casing, compartments in the wheel, means for heating the interior of the casing and means for feeding stuffing material into the compartments of the wheel.

4. A combined heater and stuffing apparatus for leather or the like material, comprising a closed, hollow casing, an opening with a hinged closure on opposite sides of the casing, means for holding the hinged closures in a raised or open position, fastening means on the inside of the closures, a rotary stuffing-wheel within the casing, compartments within the wheel, a hinged door for each compartment, and means on the doors for engaging the fastening means of the closure.

5. A stuffing-wheel for leather or the like material, comprising a shaft, a hub fastened near each end of the shaft, radial grooves in each hub, radial pieces having their inner ends fitting said grooves and secured to the hubs, end pieces connecting the outer ends of the radial pieces of each hub, outer longitudinal pieces connecting the ends of the radial pieces of one hub with the corresponding ones of the other hub, inner longitudinal pieces parallel to the outer longitudinal pieces and connected to the radial pieces of the hubs, separated slats fastened to the outer and inner longitudinal pieces thereby forming sector-shaped and slatted compartments about the shaft, separated slats closing a section of the outer sides of each compartment, and a movable slatted door for the other section of the outer side of each compartment.

6. A stuffing-wheel for leather or the like material, comprising a shaft, a hub fastened near each end of the shaft, an extension on each hub, radial grooves in each side of the extension, radial pieces having their inner ends secured in the grooves, end pieces between and connecting the outer ends of the radial pieces of each hub, outer longitudinal pieces connecting the ends of the radial pieces of one hub with the corresponding ones of the other hub, inner longitudinal pieces parallel to the outer longitudinal pieces and similarly connected to the radial pieces of the hubs, separated slats fastened to the outer and inner longitudinal pieces thereby forming sector-shaped and slatted compartments about the shaft, separated slats closing a section of the outer sides of each compartment, and a removable slatted door for the other section of the outer side of each compartment.

7. A stuffing-wheel for leather or the like material, comprising a shaft, a hub fastened near each end of the shaft, an extension on each hub, radial grooves in each side of the hub extension, radial pieces having their inner ends fitting said grooves, a plate on each side of the hub extension and outside of the radial pieces, fastening means passing through the extensions and plates, end pieces between and connecting the outer ends of the radial pieces of each hub, outer longitudinal pieces connecting the ends of the radial pieces of one hub with the corresponding ones of the other hub, inner longitudinal pieces parallel to the outer longitudinal pieces and similarly connected to the radial pieces of the hubs, separated slats fastened to the outer and inner longitudinal pieces thereby forming sector-shaped and slatted compartments about the shaft, separated slats closing a section of the outer sides of each compartment, and a removable slatted door for the other section of the outer side of each compartment.

8. A combined heater and stuffing apparatus for leather or the like material, comprising a hollow casing, a rotary stuffing-wheel in the casing, compartments within the wheel, a charging-opening on one side of the casing and a discharging-opening on the opposite side of the casing.

9. A combined heater and stuffing apparatus for leather or the like material, comprising a hollow casing, a rotary stuffing-wheel in the casing, compartments within the wheel, a charging-opening on one side of the casing, a discharging-opening on the opposite side of the casing, and a closure for each of the openings.

10. A combined heater and stuffing apparatus for leather or the like material, comprising a hollow casing, a rotary stuffing-wheel in the casing, compartments within the wheel, a door for each compartment, a fastening-eye on each door, means for introducing stuffing material into the compartments, a charging-opening on one side of the casing, a discharging-opening on the opposite side of the casing provided with a closure, and a hook on the inner side of the closure for engaging the hooks of the doors.

11. A stuffing-wheel for leather or the like material, comprising a rotary stuffing-wheel. compartments within the wheel, a suspension-rod in each of the compartments, and means for feeding stuffing material into said compartments.

12. A stuffing-wheel for leather or the like material, comprising a rotary stuffing-wheel, slatted compartments within the wheel, a suspension-rod in each of the compartments, means for feeding stuffing material into said compartments.

13. A combined heater and stuffing apparatus for leather or the like material, comprising a hollow casing, a rotary stuffing-wheel within the casing, compartments in said wheel, a suspension-rod in each of the compartments, and means for heating the interior of the casing.

14. A combined heater and stuffing apparatus for leather or the like material, comprising a hollow casing, a rotary stuffing-wheel, within the casing, slatted compartments in the wheel, a suspension-rod in each of the compartments, means for feeding stuffing material into the said compartments and means for heating the interior of the casing.

15. A combined heater and stuffing apparatus for leather or like material, comprising a closed, hollow casing, an opening with a closure therefor on opposite sides of the casing, a rotary stuffing-wheel within the casing, compartments in said wheel, and a suspension-rod in each of the compartments.

16. A combined heater and stuffing apparatus for leather or the like material, comprising a closed, hollow casing, an opening with a hinged closure on opposite sides of the casing, means for holding the hinged closures in a raised or open position, fastening means on the inside of the closures, a rotary stuffing-wheel within the casing, compartments within the wheel, a hinged door for each compartment, a suspension-rod in each compartment and held therein by the hinged door thereof, and means on the doors for engaging the fastening means of the closure.

17. A stuffing-wheel for leather or the like material, comprising a shaft, a hub fastened near each end of the shaft, radial grooves in each hub, radial pieces having their inner ends fitting said grooves and secured to the hubs, end pieces connecting the outer ends of the radial pieces of each hub, outer longitudinal pieces connecting the ends of the radial pieces of one hub with the corresponding ones of the other hub, inner longitudinal pieces parallel to the outer longitudinal pieces and connected to the radial pieces of the hubs, separated slats fastened to the outer and inner longitudinal pieces thereby forming sector-shaped and slatted compartments about the shaft, a suspension-rod in each of the compartments, separated slats closing a section of the outer sides of each compartment, and a movable slatted door for the other section of the outer side of each compartment, said slatted door supporting one end and holding the suspension-rod in the compartment.

18. A stuffing-wheel for leather or the like material, comprising a shaft, a hub fastened near each end of the shaft, an extension on each hub, radial grooves in each side of the hub extension, radial pieces having their inner ends fitting said grooves, a plate on each side of the hub extension and outside of the radial pieces, fastening means passing through the extensions and plates, end pieces between and connecting the outer ends of the radial pieces of each hub, outer longitudinal pieces connecting the ends of the radial pieces of one hub with the corresponding ones of the other hub, inner longitudinal pieces parallel to the outer longitudinal pieces and similarly connected to the radial pieces of the hubs, separated slats fastened to the outer and inner longitudinal pieces thereby forming sector-shaped and slatted compartments about the shaft, a suspension-rod in each of the compartments, separated slats closing a section of the outer sides of each compartment, and a removable slatted door for the other section of the outer side of each compartment, said slatted door supporting one end and holding the suspension-rod in the compartment.

19. A combined heater and stuffing apparatus for leather or like material, comprising a closed, hollow casing, an opening with a closure therefor on opposite sides of the casing, a rotary stuffing-wheel within the casing, compartments in said wheel, and a removable suspension-rod in each of the compartments.

20. A combined heater and stuffing apparatus for leather or the like material, comprising a closed, hollow casing, an opening with a hinged closure on opposite sides of the casing, means for holding the hinged closures in a raised or open position, fastening means on the inside of the closures, a rotary stuffing-wheel within the casing, compartments within the wheel, a hinged door for each compartment, and a removable suspension-rod in each compartment and held therein by the hinged door thereof.

21. A stuffing-wheel for leather or the like material, comprising a shaft, a hub fastened near each end of the shaft, radial grooves in each hub, radial pieces having their inner ends fitting said grooves and secured to the hubs, end pieces connecting the outer ends of the radial pieces of each hub, outer longitudinal pieces connecting the ends of the radial pieces of one hub with the corresponding ones of the other hub, inner longitudinal pieces parallel to the outer longitudinal pieces and connected to the radial pieces of the hubs, separated slats fastened to the outer and inner longitudinal pieces thereby forming sector-shaped and slatted compartments about the shaft, a removable suspension-rod in each of the compartments, separated slats closing a section of the outer sides of each compartment, and a movable slatted door for the other section of the outer side of each compartment, said slatted door supporting one end and holding the suspension-rod in the compartment.

In testimony whereof I affix my signature in presence of two witnesses.

PAUL H. GRIMM.

Witnesses:
 BRUCE C. WILSON,
 HARRY H. WHITING.